July 10, 1962
G. E. SNODGRASS
3,043,261
PUNTING POLE
Filed Sept. 17, 1956
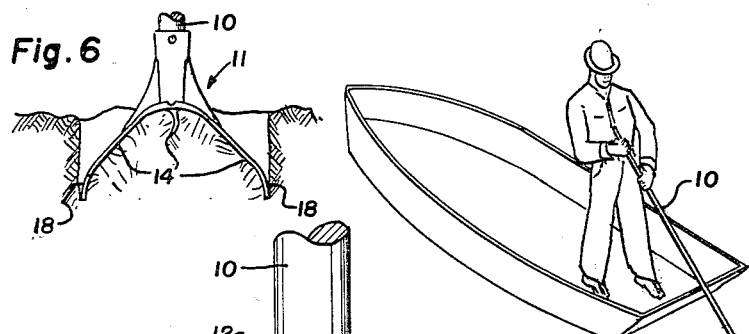
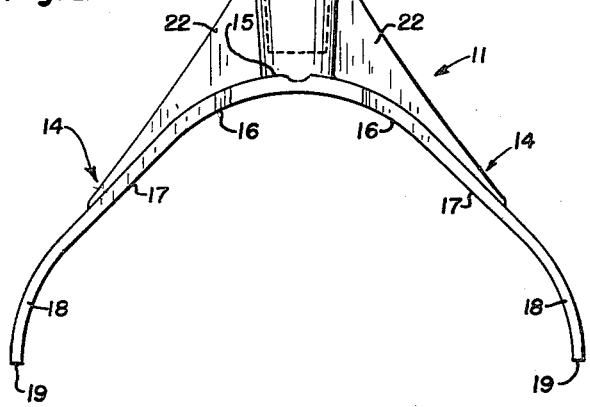
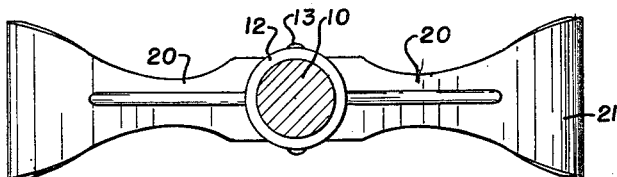
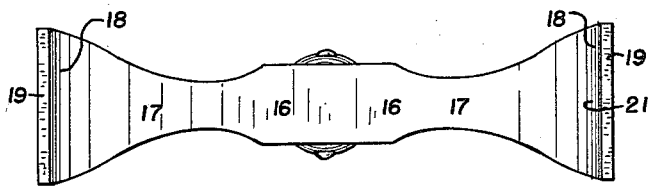
INVENTOR.
George E. Snodgrass
BY Whitehead, Vogl & Lowe
PER. Frank G. Lowe
ATTORNEYS

3,043,261
PUNTING POLE
George E. Snodgrass, 5247 Monroe St., Denver, Colo.
Filed Sept. 17, 1956, Ser. No. 610,054
1 Claim. (Cl. 115—9)

This invention relates to poles and similar equipment for pushing or punting a boat through shallow water, the primary object of the invention being to provide an improved construction for the head of a punting pole which is especially adapted for punting a boat through bogs, tules, rice fields and the like. The present invention is a development from and improvement over my copending application which was filed June 26, 1953, Serial No. 364,305 which matured into Patent No. 2,787,795, issued April 9, 1957.

In the United States and Canada there exist immense game reserves and other areas which are primarily shallow ponds and river beds wherein dense tule growths, fields of wild rice and the like grow in abundance, and in season become hunting grounds for ducks and geese. The propelling of a boat in these areas with oars or propellers is difficult and will also cut and damage the wild rice. Because of this it is often required by the game laws or policing authorities that the boats be moved only by punting or poling operations to preserve the rice and to disturb the natural growths as little as possible. Moreover, anyone boating in such areas quickly learns that such punting or poling is the natural and only sensible way of moving the boat.

Often, however, when poling a boat through such shallow waters the soft mud will yield and stick to the pole and considerable difficulty may be encountered in moving the boat and releasing the pole. Because of these factors, the present invention was conceived and developed, and subsequently improved to form a punting pole which is universally adapted for pushing a boat through shallow waters regardless of the types of growths.

It follows that further objects of the invention are to provide an improved punting pole and head therefor which: (a) is adapted to be used to propel a boat by pushing against plant growths without damaging the plants and may be pushed against the base of a clump of plants or against their stems; (b) may be used to push a boat through tules and other plant growths in places where it would be difficult or impossible to use oars or an ordinary punting pole; (c) may be used as an oar as well as a pole; (d) incorporates an improved head arrangement having diverging arms which may be pushed into a yielding clump of plant growth or into a soft mud bank in a manner which most effectively compresses the growths or mud materials for pushing thereagainst; (e) incorporates in such arrangement a form of arms which permits the pole to be easily pulled free of muck or mud into which the pole might be pushed; and (f) is a simple, rubbed, durable and inexpensive unit.

With the foregoing and other objects in view, all of which more fully hereinafter appear, my invention comprises certain novel and improved constructions, combinations and arrangements of parts and elements as hereinafter described and as defined in the appended claim, and illustrated in preferred improved embodiment in the accompanying drawing, in which:

FIGURE 1 is a sketch depicting a man propelling a flat-bottomed boat through a rice field with the improved punting pole.

FIGURE 2 is an elevation view of the head of the pole with only a fragmentary portion of the handle thereof being illustrated.

FIGURE 3 is a side elevation view of the unit as taken from the indicated arrow 3 at FIG. 2.

FIGURE 4 is a top plan view of the head of the unit with the handle thereof being shown in section.

FIGURE 5 is a bottom plan view of the unit.

FIGURE 6 is a sketch, similar to FIG. 2 but on a reduced scale, showing the head of the punting pole, as being pushed into mud or like yielding material.

Referring more particularly to the drawing, the improved pole is formed by a handle 10 of any suitable length and has a forked head 11 at one end thereof. When this pole is used to propel a boat through shallow water and through tules, rice fields and the like, the forked head 11 is pushed against the bottom of the water body or against a mass or clump of plants. Such material gathers in the throat or crotch of the fork to serve as an abutment against which the pole is pushed to propel the boat.

The head 11 is formed about a ferrule 12 having a suitable recess 12a for receiving the end of the handle, and any conventional means such as pin 13 in the ferrule may be used to fasten the head to the handle. Two arms 14 extend outwardly and downwardly from opposite sides of the ferrule to provide the forked construction of the head hereinbefore referred to and the improvement which constitutes my invention lies in the construction of these arms to accomplish the hereinbefore stated objects.

Referring to the axis of the unit as the axis of the handle and ferrule, the arms 14 extend outwardly from this axis in symmetrical opposition from the base 15 of the ferrule. Each arm arches outwardly and downwardly from the base 15 in a central curve 16 to define a crotch between the arms. Each arm forming a side of this crotch fairs into a straight reach-section 17 beyond the central curve 16 which is inclined from the axis of the unit at approximately 45 degrees. The end of each arm beyond the straight section 17 curves inwardly about a terminal curve 18 to terminate in an alignment substantially parallel with the axis of the unit. The end of each arm is preferably a flat bottom 19 transverse to the axis of the unit.

The arms so curved constitute a single flat curved member which can be technically defined as the segment of a cylinder, with the elements thereof being in spaced parallelism and normal to the axis of the unit. This flattened, flanged surface has a width at the crotch center curve 16, which is at least as wide as the ferrule and which is sufficient to prevent the cutting of plants and the like when the unit is being pushed against them, such being especially important when poling through rice fields. The width of each arm is preferably somewhat narrowed as at 20 in the portion of the straight-reach section 17 next to the crotch center curve 16 but widens and is substantially widened at the terminal curve 18 with maximum width at the bottom 19. This widened terminal curve 18 thereby forms opposing scoops 21 for directing the movement of materials inwardly to the crotch center curve 16. To reinforce these arms opposed gussets 22 may be disposed at each side of the arms and ferrule in the manner illustrated.

The opposing scoops 21 with the flat bottom edges 19 are aligned to direct the bottoms 19 of the arms directly into a mud bank or the like, such being in alignment with the axis of the unit. Further movement directs the mud or material between the arms inwardly along the end curve 18 to the inclined straight section 17. It was discovered that the curved scoops 21 were especially effective in holding mud and the like as well as plants and more solid bushes and hummocks when the punting pole was being pushed for moving the boat.

The manner in which the improved head displaces this material when it is being pushed into mud or muck is illustrated at FIG. 6. The ends of the scoop 21 are in alignment with the axis of the pole and the pushing operation actually cuts into the mud and tends to embrace that portion of the mud between the arms.

More important is the easy release of the arms from the mud or muck into which the pole is being pushed. In many shallow water bodies the bottom, banks and hummocks are of clay-like mud which yields easily but which is exceptionally sticky and tends to produce a suction preventing the pole from being released when it is being withdrawn after the pushing operation. When the pole is retracted, the straight cut in the mud bank by the comparatively wide ends of the scoop 21 does not cause the clay sides to stick while the narrower portion 20 at the straight reach 17 effectively permits a release from the material between the arms without creating a suction such as would resist the pulling away of the punting pole.

It was further discovered that the wide scoops would permit the pole to be used as an oar by a simple rowing operation and that the pole could be effectively used for sculling either by lateral movements akin to conventional sculling movements or by reciprocal movements because of the opposing curved form of the head.

While I have described my invention in detail, it is obvious that alternatives and equivalent arrangements can be devised by those skilled in the art and which are within the scope and spirit of my invention. Hence, it is my desire that my protection be limited, not by the details of construction herein illustrated, but only by the proper scope or the appended claim.

I claim:

A punting pole for pushing a boat through shallow water comprising an elongated handle and a head secured to one end of said handle, said head comprising a ferrule for receiving the end of said handle, a fork on the forward end of said ferrule provided by forwardly and outwardly extending divergent arms disposed in a common plane substantially coinciding with and parallel to the longitudinal axis of said handle, the inner surfaces of said arms providing a flat continuous surface having an arcuate central portion merging into a straight flat portion on each arm extending outwardly and forwardly at an angle to the axis of said handle, each straight portion merging into a curved portion terminating at the end of each arm, a tangent to said curved portion at the end of each arm being substantially parallel to the axis of said handle, the width of said straight flat portions being substantially less than the width of said central arcuate portion and flaring outwardly to the ends of said curved portions, whereby the width of the ends of said curved portions are substantially greater than the width of said arcuate central portion.

References Cited in the file of this patent

UNITED STATES PATENTS

| 728,938 | Krabach | May 26, 1903 |
| 1,104,338 | Babitzky | July 21, 1914 |
| 1,164,361 | Kilgore | Dec. 14, 1915 |
| 2,747,917 | Smith | May 29, 1956 |
| 2,787,795 | Snodgrass | Apr. 9, 1957 |

FOREIGN PATENTS

| 20,440 | Great Britain | 1911 |